No. 856,445. PATENTED JUNE 11, 1907.
S. A. COFFMAN.
MATTRESS STUFFING MACHINE.
APPLICATION FILED OCT. 2, 1906.
3 SHEETS—SHEET 2.
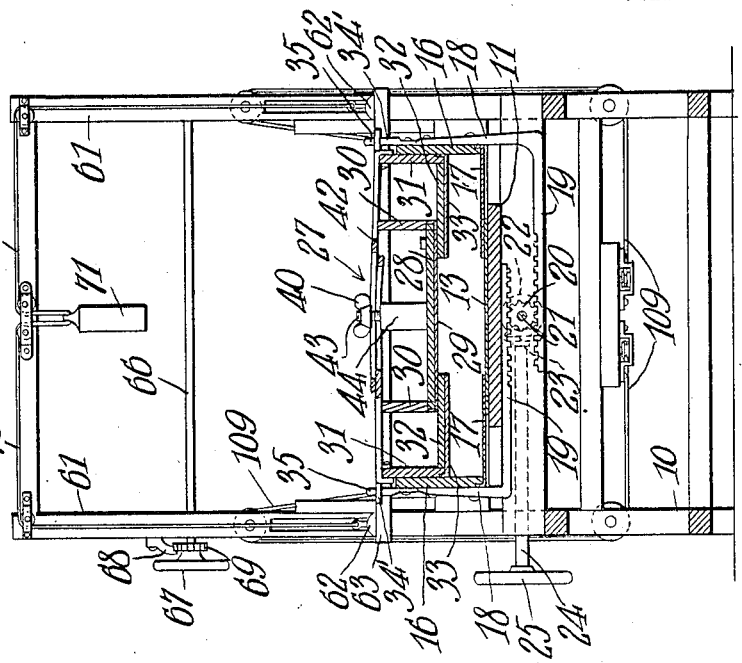
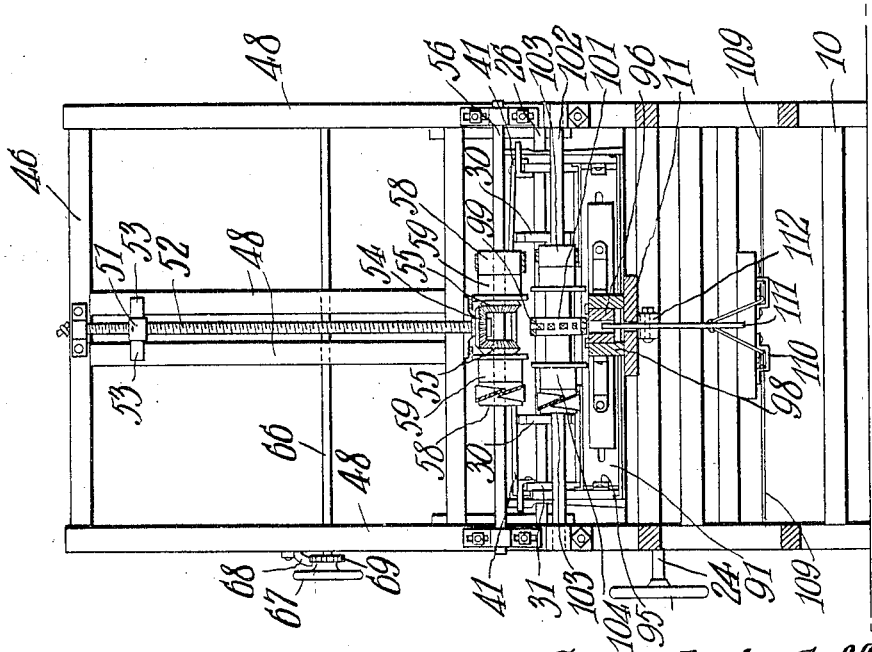
WITNESSES:
Samuel A. Coffman,
INVENTOR.
By C. A. Snow & Co.
ATTORNEYS No. 856,445. PATENTED JUNE 11, 1907.
S. A. COFFMAN.
MATTRESS STUFFING MACHINE.
APPLICATION FILED OCT. 2, 1906.
3 SHEETS—SHEET 3.
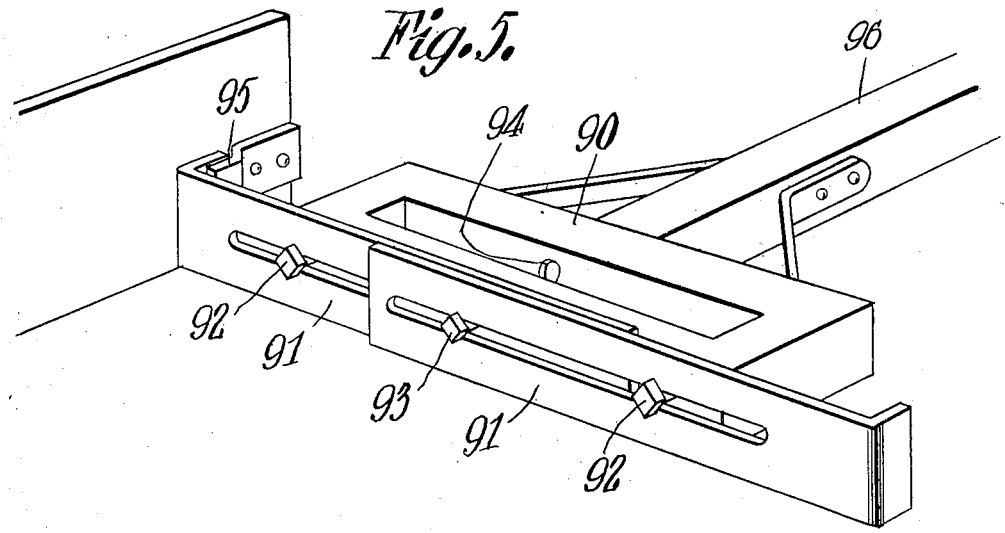
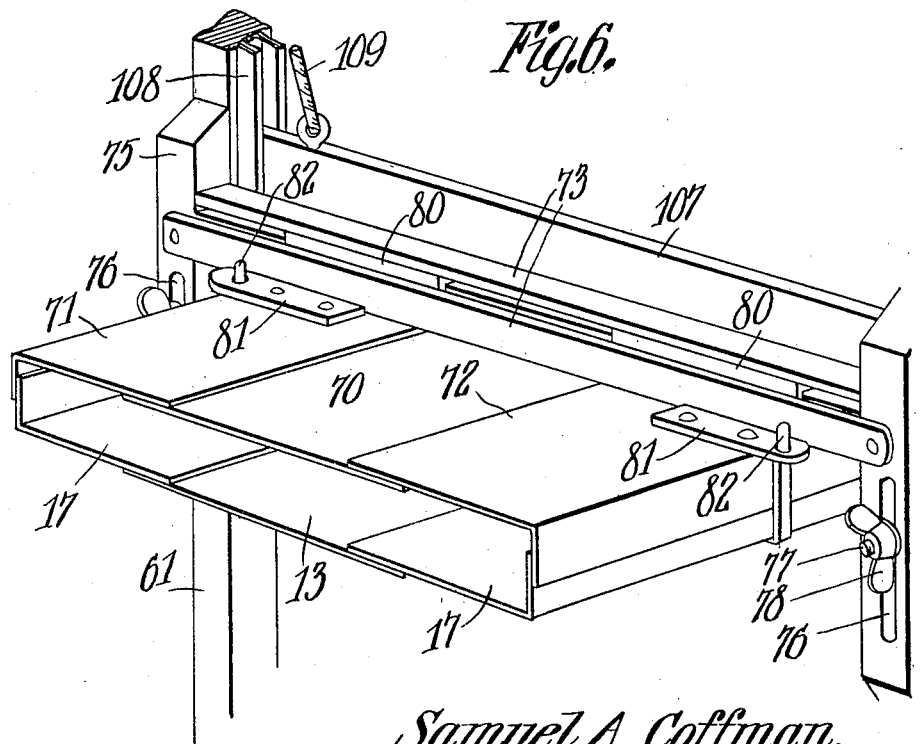

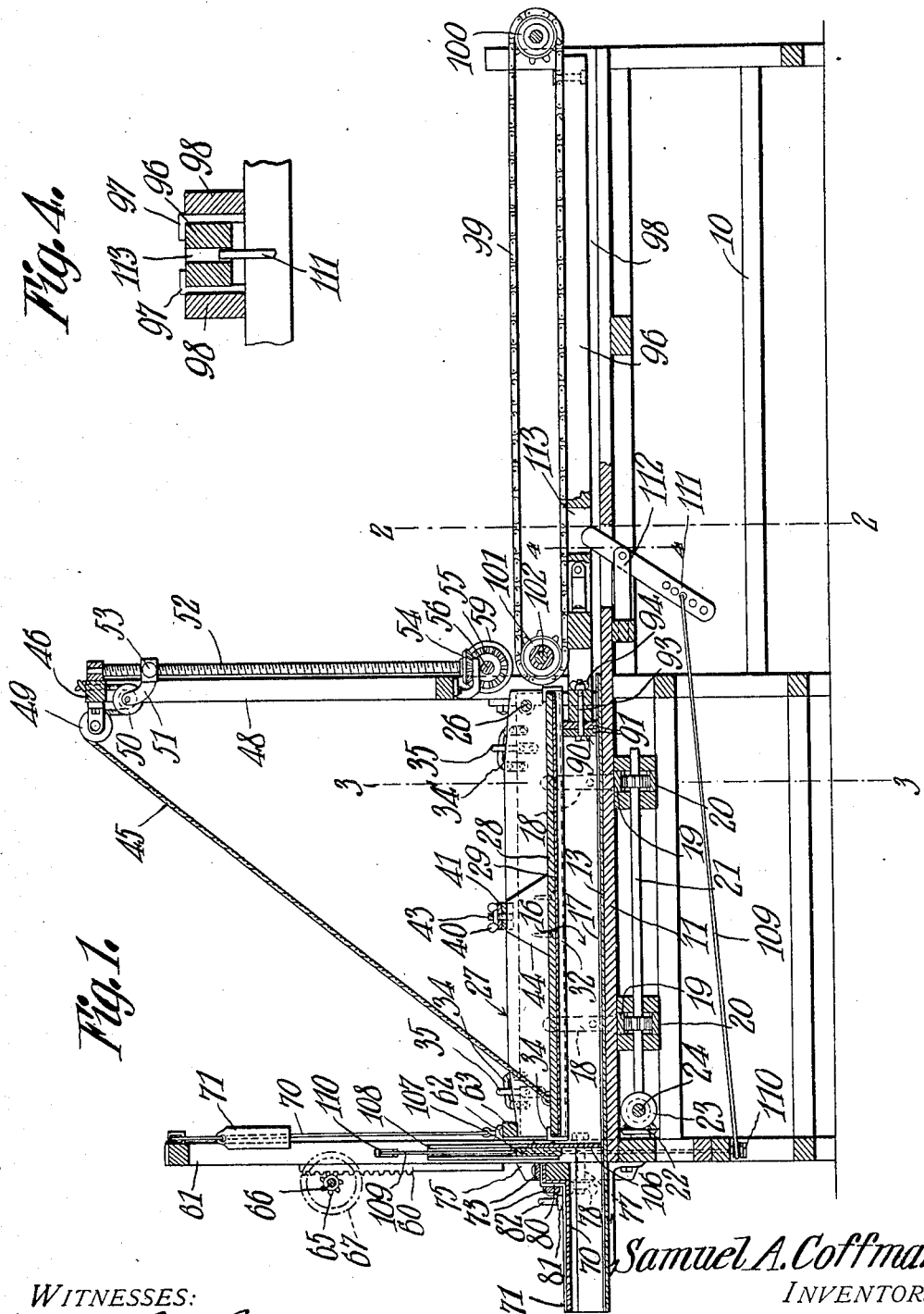

UNITED STATES PATENT OFFICE.

SAMUEL A. COFFMAN, OF MARIETTA, OHIO.

MATTRESS-STUFFING MACHINE.

No. 856,445.　　　Specification of Letters Patent.　　　Patented June 11, 1907.

Application filed October 2, 1906. Serial No. 337,080.

*To all whom it may concern:*

Be it known that I, SAMUEL A. COFFMAN, a citizen of the United States, residing at Marietta, in the county of Washington and State of Ohio, have invented a new and useful Mattress-Stuffing Machine, of which the following is a specification.

This invention relates to mattress stuffing machines, and has for its principal object to provide a machine by which the filling material may be subjected to any desired degree of pressure and forced bodily into the tick.

A further object of the invention is to provide a machine of this character that can be readily adjusted in order to form mattresses of any width.

A still further object of the invention is to provide a machine of such construction that the width of the stuffing receiving chamber, the spout, and the plunger may all be altered simultaneously.

A still further object of the invention is to provide a novel means for raising and lowering the lid of the stuffing box, and further to provide improved means for forcing the lid down to closed position to compress the stuffing material and hold the same under pressure while being forced into the tick.

Further objects of the invention are to improve, simplify and cheapen the construction of machines of this type, and to so arrange them as to permit of ready manipulation.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a longitudinal sectional elevation of a mattress stuffing machine constructed in accordance with the invention. Fig. 2 is a transverse sectional view of the same on the line 2—2 of Fig. 1. Fig. 3 is a similar view on the line 3—3 of Fig. 1. Fig. 4 is a transverse section on the line 4—4 of Fig. 1. Fig. 5 is a detail perspective view of the head of the plunger. Fig. 6 is a detail perspective view of the spout.

Similar numerals of reference are employed to indicate corresponding parts throughout the several figures of the drawings.

The working parts of the machine are supported on a suitable frame 10 which may be formed of wood or metal, and at the top of which is a horizontally disposed bed or table 11. The top of the central portion of the table is covered by a metallic plate 13 which extends from the rear end of the compression chamber out to the discharge end of the spout, this plate being permanently secured in place. At the opposite sides of the table are arranged vertical plates 16, to the lower edges of which are secured the vertical flanges of metallic plates 17, the edges of which overlap the edges of the plate 13, these plates being extended out to the discharge end of the spout, as shown in Fig. 6. Connected to the side walls 16 are the vertical arms 18 of two sets of rack bars 19, each set of rack bars being mounted in suitable guides below the table 11, and being engaged by a pinion 20. The two pinions are mounted on a shaft 21 that is adapted to suitable bearings carried by the frame and is provided at one end with a bevel gear 22 which intermeshes with a similar bevel gear 23, the latter being carried by a transversely disposed shaft 24 that is provided at one end with a hand wheel 25 which may be turned for the purpose of operating the shaft and moving the side plates toward or from each other for the purpose of varying the width of the compression chamber and the discharge spout.

At a point above the rear end of the compression chamber is a transversely disposed rod 26 on which is pivoted the lid or cover 27 of the compression chamber. This lid or cover comprises a central web 28, the lower face of which is sheathed by a strip of metal 29 and the plate 28 is reinforced at each edge by longitudinal bars 30. At each side of the lid or cover is a bar 31 carrying a plate 32 provided with a metallic sheathing 33, and the end of each plate 32 is provided with an angularly bent arm 34 which extends up over the plate 28 in order that the side plates may be properly supported, and yet be free to slide toward and from each other as the width of the compression chamber is varied.

Projecting from the side bars 31 are small metallic loops 34' which are arranged near the opposite ends of the side plates, and which extend over pins 35 that are carried by the side plates 16, the construction being such that when the side plates 16 are adjusted toward and from each other, the corresponding portions of the cover will be similarly adjusted. When the cover is adjusted, the parts are locked in place by a thumb nut 40 which engages a pair of slotted bars 41 carried by the side bars 31 and extending inward over a screw 43 that is carried by a short post or block 44 on the center plate 28.

The rod 26 forms a pivot on which the rod or cover may be swung to open or closed position, and for this purpose a cable 45 is employed, the cable being connected at one end to the lid or cover, and being secured at the opposite end to a cross bar 46 that is carried by a plurality of vertically disposed bars 48 that constitute a part of the frame of the machine, the cable passing over a stationary sheave 49, and running sheave 50.

The running sheave 50 is carried by a bracket 51 that has a threaded opening for the reception of a vertically disposed screw 52 supported by the frame, and the opposite sides of the bracket are provided with arms 53 which engage against two of the bars 48 for the purpose of preventing rotative movement of said bracket. The lower end of the screw 52 is provided with a bevel gear 54 which is engaged by a pair of bevel gears 55, both of which are mounted loosely on a transversely disposed shaft 56 that is carried by suitable bearings on the frame. Mounted loosely on the shaft 56 is a pair of pulleys 58, one of which is driven by a straight belt and the other by a crossed belt, so that the pulleys rotate in opposite directions, respectively, and clutching members 59 are introduced between the pulleys and the bevel gears, so that one or other of said bevel gears may be rotated for the purpose of turning the screw and causing the travel of the nut 53 along said screw, and in this manner moving the cover to open or closed position.

When the cover is moved down to closed position, pressure may be exerted thereon by a pair of rack bars 60 that are mounted in suitable guides formed in posts 61 near the discharge end of the machine. Each of these racks has a rearwardly extending lug 62 arranged to engage a cross bar 63 at the forward end of the cover, and said racks are engaged by pinions 65 carried by a transversely disposed shaft 66 that is mounted in bearings in the frame and is provided with a hand wheel 67 which may be turned for the purpose of forcing the racks down and exerting pressure on the cover. When the cover has been depressed, it may be locked down by a suitable bolt 68 which engages a ratchet wheel 69 carried by the shaft 66. The two racks are connected by flexible cables 70 to a counter-weight 71, the cable being guided over suitable sheaves supported by the frame, and when the pawl 68 is moved to release position, the weight will act to raise the racks and release the cover, so that the latter may be moved to open position when a new supply of material is to be inserted in the compression chamber.

The lower portion of the spout, which is formed of the plates 13 and 17 has been already described. The upper section is formed of three plates 70, 71 and 72, of which the central plate is secured to a pair of cross bars 73 carried by a pair of blocks 75 that are provided with vertical slots 76 through which pass screws 77, the latter being engaged by thumb nuts 78 which may be turned for the purpose of locking the blocks 75 in adjusted position, this construction permitting the adjustment of the vertical height of the spout. The side plates 71 72 are provided with flanges at their rear ends, which flanges 80 fit between the cross bars 73 in such manner as to permit lateral movement of the plates 71 and 72 for the purpose of altering the width of the spout. These side plates 71 and 72 are provided with projecting arms 81 having openings for the reception of pins 82 that are carried by the vertical flanges of the side plates 17, so that as said side plates 17 are adjusted, the upper plates 71 and 72 will, also be adjusted, and the width of the spout will thus be altered simultaneously with the width of the compression chamber.

The plunger 90 is provided at its forward end with a pair of overlapping plates 91 each of which is provided with a slot for the reception of a guiding bolt 92 that extends into the main body of the plunger. The locking bolt 93 also passes through both slots and is provided with a thumb nut 94 by which the plates may be locked in adjusted position. The outer ends of the plunger plates are provided with rearwardly bent portions which in one position engage with arms 95 that are carried by the side plates 16 of the compression chamber, these arms being locked near the rear ends of the bars. When the plunger is adjusted to this position and the width of the compression chamber is altered, the plates 91 will be correspondingly moved in order that the width of the plunger may correspond to the width of the chamber, and in this manner all of the parts, that is to say, the compression chamber, the spout, and the plunger, may be simultaneously moved for the manufacture of mattresses of different width.

The plunger rod 96 extends rearward over the frame, and is guided by a pair of angle bars 97 that are carried by bars 98 forming a part of the frame. The rear end of the plunger rod is connected to a link belt 99 that passes over a roller to sprocket wheels 100 and 101, the sprocket wheel 101 being carried by a shaft 102 adapted to suitable bearings on the frame. On this shaft are two loose pulleys 103, one of which is driven by a straight belt, and the other by a crossed belt, the pulleys leading in opposite directions, respectively. Adjacent to each pulley is a clutching member 104 which may be operated for the purpose of clutching the pulley to the shaft and thus transmitting movement to the link belt, first in one direction and then in the opposite direction.

Between the end of the compression chamber and the plunger is arranged a gate 106 that is carried by a bar 107 adapted to guides 108 supported by the frame. The opposite ends of this bar 107 are connected to the lower ends of cables 109 which pass over suitable guiding sheaves 110 and are connected to the lower end of a lever 111 that is pivoted on a bracket 112 below the table of the machine. The upper end of this lever is adapted to fit within a slot 113 that is formed in the plunger rod, and when the plunger moves forward, the end wall of the slot will engage the lever and move the same for the purpose of automatically elevating the gate, and then during the continued forward movement of the plunger rod, the lever will be held in engagement with the bottom of the rod, and the gate maintained in open position. When the plunger moves to the rear, the lever will reënter the slot and allow the gate to move down to closed position by gravity.

With a machine constructed in accordance with this invention, the stuffing material may be readily placed in position and subjected to any desired degree of pressure, while the parts are so arranged as to permit rapid and simultaneous adjustment of all of the parts for the manufacture of matresses of different widths.

I claim:—

1. In a mattress stuffing machine, a compression chamber including side bars adjustable from and toward each other to vary the width of the compression chamber, a plunger having a sectional head, and adapted to reciprocate independently of any portion of said compression chamber and means for connecting the head to the side bars to permit lateral adjustment of the sectional head with the side bars.

2. In a mattress stuffing machine, a compression chamber having a bottom formed of overlapping plates, side bars connected to the side plates, means for simultaneously moving said side bars toward and from each other to vary the width of the chamber, the forward ends of all of the overlapping plates being extended to form the bottom portion of a spout, a pivotally mounted sectional cover the side members of which are adapted to be connected to the side bars, a separate series of overlapping plates forming the top of the spout, and means for positively connecting the side members of the top and bottom of the spout to insure adjustment of the latter as the side bars are adjusted, whereby the pivotally mounted sectional cover may be raised without disturbing the top of the spout.

3. In a mattress stuffing machine, a compression chamber having laterally adjustable side bars, a plunger, the compression face of which is formed of a pair of overlapping sections, the outer ends of which are bent to form rearwardly extending flanges, and means carried by the side bars for engaging said flanges, and thereby effecting adjustment of the width of the compression face of the plunger as said side bars are adjusted.

4. In a mattress stuffing machine, a compression chamber, a pivoted cover therefor, a spout formed of a plurality of sections, the uppermost sections being vertically adjustable with respect to the lowermost, a cross bar carrying the uppermost sections, vertically adjusted slotted blocks carrying the said cross bar, and means for locking said blocks in adjusted position.

5. In a mattress stuffing machine, the combination with a compression chamber, of a pivotally mounted cover, a frame, a vertically disposed screw supported by the frame, a bracket guided by the frame and having a threaded opening for the passage of the screw, means for preventing rotative movement of the bracket, a sheave carried by the bracket, a cable connected to the cover and extending over said sheave, one end of the cable being connected to a fixed part of the frame, and means for turning the screw to effect raising or lowering of the cover.

6. In a mattress stuffing machine, the combination with a frame, of a vertically disposed screw supported thereby, a cover, a cable having one end connected to the cover and the other end to a fixed point, a bracket having a threaded opening for the reception of the screw, a pair of cable guiding sheaves carried one by the frame and the other by the bracket, a bevel gear at the lower end of the screw, a shaft, a pair of bevel gears mounted loosely thereon and intermeshing with the screw gear, and means for turning one or other of said bevel gears to effect raising or lowering of the cover.

7. In a mattress stuffing machine, a compression chamber, a spout, a vertically movable gate between the two, vertical guides for said gate, a plunger, a plunger rod having a short slot, a pivotally mounted lever under the plunger rod, the upper end of said lever being arranged to enter the slot and to be moved therefrom by the plunger as the latter advances, flexible cables connecting the lever to the gate, and guiding means for said cables.

In testimony that I claim the foregoing as my own, I have hereto affixed my signature in the presence of two witnesses:

SAMUEL A. COFFMAN.

Witnesses:
 G. P. STRAHL,
 M. G. BATTIN.